(12) United States Patent
Costa-Requena et al.

(10) Patent No.: US 8,909,701 B2
(45) Date of Patent: Dec. 9, 2014

(54) IMS CONFERENCING POLICY LOGIC

(75) Inventors: Jose Costa-Requena, Helsinki (FI);
Hisham Khartabil, Helsinki (FI);
Teemu Jalava, Espoo (FI); Jarmo Kuusinen, Jyväskylä (FI); Markus Isomäki, Helsinki (FI); Petri Koskelainen, Tampere (FI)

(73) Assignee: Nokia Corporation, Espoo (FI)

( * ) Notice: Subject to any disclaimer, the term of this patent is extended or adjusted under 35 U.S.C. 154(b) by 2319 days.

(21) Appl. No.: 10/429,130

(22) Filed: May 2, 2003

(65) Prior Publication Data

US 2004/0221037 A1 Nov. 4, 2004

(51) Int. Cl.
*G06F 15/16* (2006.01)
*H04L 29/06* (2006.01)

(52) U.S. Cl.
CPC ........ *H04L 63/102* (2013.01); *H04L 29/06027* (2013.01); *H04L 63/101* (2013.01); *H04L 65/403* (2013.01)
USPC .......................................... 709/204; 709/225

(58) Field of Classification Search
USPC ................................. 709/204, 225
See application file for complete search history.

(56) References Cited

U.S. PATENT DOCUMENTS

| | | | |
|---|---|---|---|
| 6,839,417 B2 * | 1/2005 | Weisman et al. | 379/204.01 |
| 6,907,449 B2 * | 6/2005 | Srinivasan | 709/204 |
| 7,013,332 B2 * | 3/2006 | Friedel et al. | 709/223 |
| 2001/0034844 A1 * | 10/2001 | Bellovin | 713/201 |
| 2004/0128350 A1 | 7/2004 | Topfl et al. | |
| 2004/0128354 A1 | 7/2004 | Horikiri et al. | |

OTHER PUBLICATIONS

Internet Engineering Task Force (IETF), Koskelainen, Schulzrinne, Wu, Additional Requirements to Conferencing, Apr. 29, 2002.*
Internet Egineering Task Force (IETF), Koskelainen, Schulzrinne, Wu, Additional Requirments to Conferencing, Apr. 29, 2009.*
Koskelainen, Schulzrinne, Wu, Additional Requirements to Conferencing, Apr. 29, 2002, Internet Engineering Task Force (IETF).*
J. Rosenberg, "A Framework for Conferencing with Session Initiation Protocol", IETF Standard—Working Draft, Internet Engineering Task Force, IETF, Oct. 28, 2002; from the Internet.
P. Koskelainen, "Requirements for Conference Policy Data", IETF Standard—Working Draft, Internet Engineering Task Force, IETF, Feb. 24, 2003; from the Internet.
Chinese Office action of corresponding CN App. No. 200480011867.1 dated Apr. 15, 2010, pp. 1-7.
"A Framework for Conferencing with the Session Initiation Protocol", J. Rosenberg, IETF Standard—Working Draft, Internet Engineering Task Force, IETF, Oct. 28, 2002; from the Internet.
"Requirements for Conference Polisy Data", P. Koskelainen, IETF Standard—Working Draft, Internet Engineering Task Froce, IETF, Feb. 24, 2003; from the Internet.

* cited by examiner

*Primary Examiner* — Mohamed Ibrahim
(74) *Attorney, Agent, or Firm* — Harrington & Smith

(57) ABSTRACT

A method, apparatus, and system are disclosed for creating a conferencing access logic. The logic is for allowing access to a conference in an internet protocol (IP) network. The invention entails establishing an allow list of allowed users, setting up a default policy applicable to unlisted users, matching listed users with corresponding conference rights, and assigning a uniform resource identifier (URI) to the access logic. The URI is for identifying and editing elements of the access logic, including the allow list, the default policy, and the conference rights.

31 Claims, 8 Drawing Sheets

IMS CONFERENCING POLICY LOGIC

TECHNICAL FIELD OF THE INVENTION

The invention relates to telecommunications conferencing, and more particularly to conference access.

BACKGROUND ART

When more than two people participate in a telecommunications session, the session becomes a conference. An Access Control List (ACL) is typically used to define who is allowed (or not allowed) to join the conference. If a user attempts to join a conference, but the user is not in the ACL then (depending on the conference policy), the conference chair may be consulted whether the user can be accepted to join the conference. Thus, there must be a mechanism to define the Access Control List (ACL) so that user access can be pre-authorized (or denied). It must be possible to add and delete users to/from the ACL. It can be possible to consult a user with appropriate privileges (such as the chair or the owner) when an unknown user tries to join the conference. The chair may accept or deny the join attempt.

Conference participants may have different privileges (i.e. rights). In the simplest case, only two kinds of participants exist: the conference chair (with all the privileges), and normal participants (without any privileges). For example, the following privileges may be supported:
- Right to terminate a conference
- Right to disconnect participants
- Right to manage general conference properties
- Right to manage conference access control list (ACL)
- Right to manage conference-wide media sessions (e.g. add audio session into conference)
- Right to manage other participant's session parameters (such as media)
- Right to make real-time authorization (for join attempts)
- Right to hand-off all (or some of) the above privileges to another participant Some conferences may utilize more complex privilege definition and hierarchy; such as guru-participants having the right to disconnect participants. Therefore, protocol mechanisms must be in place to translate these rights into actions. It must be possible to define different privileges to different participants. It may be possible that different participant levels are defined (e.g. senior-member, panelist), having different rights. Rules should be defined for special cases, such as if the chair leaves suddenly, or the chair tries to take privileges away from all privilege holders. Also, it must be possible to add and delete users into and from the ACL white list (allowed to join) and the ACL black list (not allowed to join). The ACL conflicts must be solved in a well-defined way (e.g. what if user appears both in black list and in white list). It should be possible to use wildcards in ACL (such as *.company.com in white list), and it should also be possible to allow and disallow anonymous and/or hidden users to access the conference.

All of these requirements have not yet been met. These requirements need to be met somehow, and that is the problem to which the present invention is addressed. The present invention is also more generally directed at solving the problem of defining a conferencing policy that will be run when a conference is created.

A typical Session Initiation Protocol (SIP) conference includes a focus, which is defined as an SIP user agent. The focus maintains an SIP signaling relationship with each participant in the conference. The focus is responsible for ensuring, in some way, that each participant receives the media that make up the conference. The focus also implements conference policies, and is a logical role.

A floor is defined as a set of shared resources within a conference; a single conference may have multiple floors. A conference member is a member or participant that has a signaling relationship with the conference focus, and receives one or more of the media streams that are part of the conference.

A conference owner is a privileged user who defines rules for running the conference; by default, the conference creator becomes the owner, but the role can be delegated to another entity. The conference owner may delegate some of these responsibilities to another party. The conference owner does not have to be a member in the conference.

A chair is normally a person who manages one floor by granting, denying, or revoking privileges. The chair does not have to be a member of the conference. The chair is sometimes also referred to as the moderator. Different floors within a conference may have different chairs, and chairs may change during a conference. A conference client will therefore be either an ordinary member, or alternatively will be a chair.

SIP supports the initiation, modification, and termination of media sessions between user agents. These sessions are managed by SIP "dialogs," which represent an SIP relationship between a pair of user agents. Because dialogs are between pairs of user agents, SIP's usage for two-party communications (such as a phone call), is relatively obvious. Communications sessions with multiple participants (i.e. conferencing) is more complicated.

FIG. 1 depicts the overall conferencing architecture. As mentioned, the "focus" is an SIP user agent that is addressed by a conference URI. The focus maintains an SIP signaling relationship with each participant in the conference. The focus is responsible for insuring, in some way, that each participant receives the media that make up the conference. The focus also implements conference policies. The focus is a logical role. Participants or "clients" are user agents, each identified by a URI, which are connected to the focus for a particular conference. A "conference policy server" is a logical function which can store and manipulate rules associated with participation in a conference. These rules include directives on the lifespan of the conference, who can and cannot join the conference, definitions of roles available in the conference and the responsibilities associated with those roles, and policies on who is allowed to request which roles. The conference policy server is a logical role. A "media policy server" is a logical function which can store and manipulate rules associated with the media distribution of the conference. These rules can specify which participants receive media from which other participants, and the ways in which that media is combined for each participant. In the case of audio, these rules can include the relative volumes at which each participant is mixed. In the case of video, these rules can indicate whether the video is tiled, whether the video indicates the loudest speaker, and so on. A "mixer" receives a set of media streams, and combines their media in a type-specific manner, redistributing the result to each participant. A "conference server" is a physical server which contains, at a minimum, the focus, but may also include a media policy server, a conference policy server, and a mixer. A "floor control server" is another term for "floor controller," and is responsible for determining which participant(s) in a conference are allowed to speak at any given time, based on participant requests as well as access rules and the chair's decisions.

A floor control protocol is used to convey the floor control messages among the moderator or moderators of the conference, the conference server and the participants of the conference. The floor control protocol does not deal with the conference management such as how to elect the moderator of the conference or how to add users to the conference.

In the past, conferences were created and the policy was statically defined on the server. The simplest approach was to provide offline a conference ID and password to users who are allowed to join the conference. According to that simple approach, there was no real user identification for joining the conference; any user with the correct conference ID and password could join. Although access control lists for conferences have now become a familiar concept, their implementation still fails to satisfy the wide variety of current requirements.

DISCLOSURE OF THE INVENTION

The present invention is to implement a conferencing policy based on a specific type of logic for allowing or rejecting users that want to join a conference. This invention presents a method of creating a conferencing access logic, for a conference in an internet protocol (IP) network such as an IP multimedia subsystem (IMS).

The present method includes establishing at least one allow list of allowed users, setting up a default policy applicable at least to unlisted users, matching listed users with corresponding conference rights, and assigning a uniform resource identifier to the access logic, for editing elements of the access logic, said elements including the at least one allow list, the default policy, and the conference rights.

The access logic can, for example, be retained in a conference server after the conference is completed, and then the access logic is retrievable and editable, using the uniform resource identifier, for use in at least one additional conference. The access logic is preferably implemented using extensible markup language (XML), and the logic can be stored in a conference server by an operator or it can be uploaded to the conference server when the conference is created.

According to an advantageous embodiment of the invention, a particular access sanity algorithm is formed that corresponds to the default policy applicable to unlisted users. So, users listed simultaneously in both the allow list and deny list get a type of access that is identical to the access that is applied to completely unlisted users.

The present invention covers the conferencing access mechanism based on member lists that are embedded in a logic that can be implemented using any scripting language such as extensible markup language (XML), Call Processing Language (CPL) or similar. The invention does not define what protocol should be used for uploading that logic into the conferencing server, but any reliable (Hypertext Transfer Protocol HTTP) or not reliable (SIP) could be used. Those protocols could include the logic script in the payload and upload it to the conference server. The conference server, upon receiving the logic, should assign a uniform resource identifier (URI) to the logic in order to facilitate its addressing and management after being uploaded. The proposed logic can be statically created and apply to all conferences created within the same conference server. The same logic can be defined and edited locally in the terminal that creates the conference and uploaded at the time when the conference is set up. The preferred mechanism for implementing the conferencing logic is based on XML, and it will use a specific schema for conferencing, although any similar scripting language would suffice.

The present invention also covers an apparatus for implementing the method. This apparatus is for creating a conferencing access logic that governs access to a conference in an internet protocol (IP) multimedia subsystem (IMS). The apparatus comprises means for establishing at least one allow list of allowed users, means for setting up a default policy applicable at least to unlisted users, means for matching listed users with corresponding conference rights, and means for editing elements of the access logic that is identified by a uniform resource identifier, said elements including the at least one allow list, the default policy, and the conference rights. The apparatus is user terminal, or a conference server responsive to the user terminal.

Moreover, the invention covers a system for creating a conferencing access logic to govern conference access in an internet protocol (IP) multimedia subsystem (IMS), the system including a conference owner terminal, for providing an access logic upload signal, and a conference server, responsive to the access logic upload signal, for providing a URI assignment signal. The conference owner terminal is responsive to the URI assignment signal, and is also for providing a URI-based logic edit signal to the conference server, so that the logic edit signal will specify the URI. This system implements a method for creating a conferencing access logic that governs access to a conference in an internet protocol (IP) multimedia subsystem (IMS). This method comprises the steps of providing an access logic upload signal to a conference server, providing a URI assignment signal to a conference owner terminal, in response to the access logic upload signal, and providing a URI-based logic edit signal to the conference server in response to the URI assignment signal.

The methods of the present claimed invention can be largely incorporated into a computer program embodied in a computer-readable medium, for storage in a physical device. The computer program is for use in an internet protocol (IP) multimedia subsystem (IMS), and is for enabling a conference owner to create a conferencing access logic for a conference, the logic including at least one allow list of allowed users, a default policy applicable at least to unlisted users, and conference rights matched to listed users. The program utilizes a uniform resource identifier for identifying the logic and enabling elements of the access logic to be edited, said elements including the at least one allow list, the default policy, and the conference rights.

BEST MODE FOR CARRYING OUT THE INVENTION

The present invention provides a method of creating a conferencing access logic, for a conference in an internet protocol (IP) multimedia subsystem (IMS). This method ensures that the conference owner can effectively and efficiently control access to the conference, while satisfying a myriad of conference access requirements.

Figure 1:
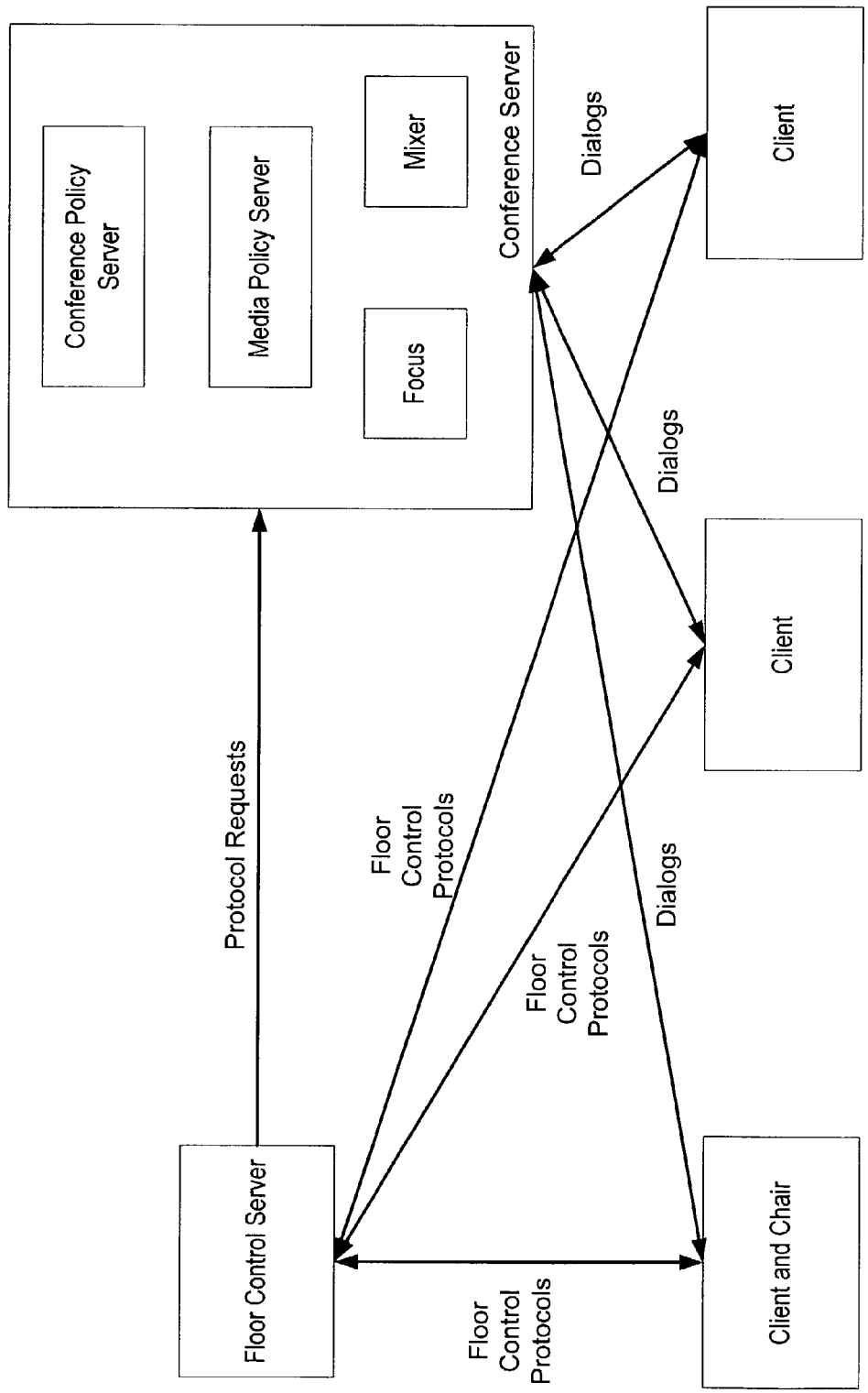
FIG. 1 depicts a typical conference architecture according to the prior art.
Figure 2:
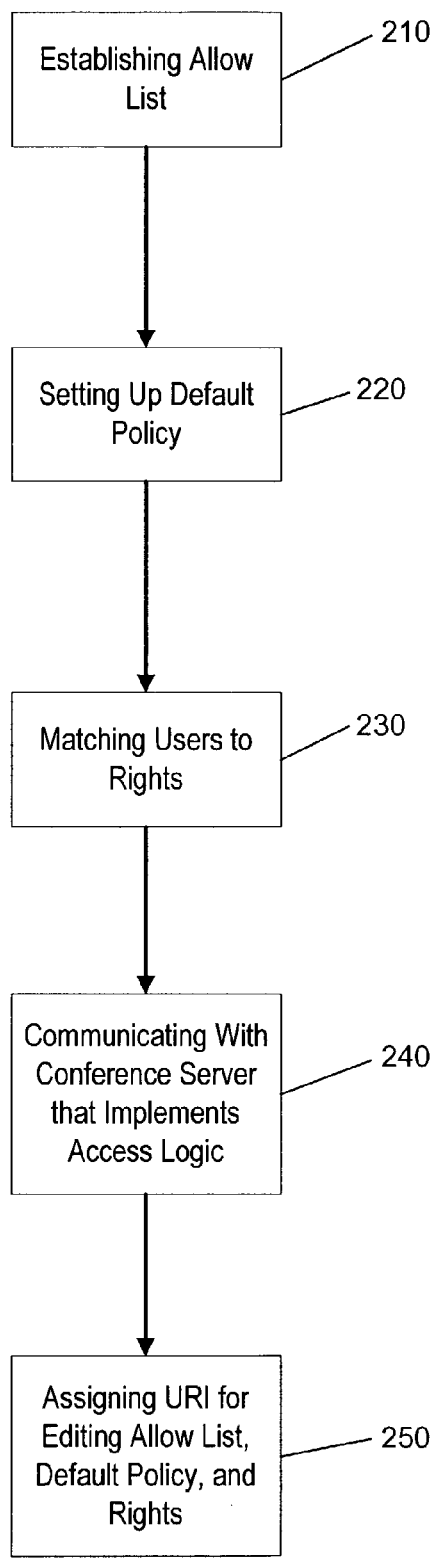
FIG. 2 is a flow chart depicting an embodiment of the present invention.

As illustrated in FIG. 2, a best mode embodiment of this method begins, for example, by establishing 210 an allow list of allowed users. Then a default policy is set up 220, describing how unlisted access-seekers will be treated. For instance, the default policy could be to deny access, to allow access, or to ask a conference owner or chair for permission to access. The next step in FIG. 2 is to match 230 listed users to rights. These rights are, for example, a right to terminate the conference, a right to transfer rights, a right to manage general conference properties, a right to disconnect participants, a right to manage at least one access control list, a right to grant permission to access the conference, a right to revoke rights, and a right to grant rights. There can be multiple allow lists, each with a specific set of rights for any listed user. Once these three key steps are completed, then communication 240 occurs with a conference server that implements the access logic. When this is done, a uniform resource identifier is assigned to the access logic, thereby allowing the access logic to be conveniently edited by making changes to the allow list, to the default policy, or to the rights that are matched to the users. It is advantageous if each of the allow lists confers a set of the conference rights on the listed users, and listing on any plurality of allow lists matches a user with a union of respective sets of the conference rights.

This approach allows the definition of access logic to users that are invited to join a conference. The logic can be based on a simple procedure that checks whether the user who would join is included in any of the member lists that compose the access logic. The logic can be rather complex, by defining a set of rights that will apply to the conference, and each member list has assigned a set of those rights. Thus, a set of member lists can be created having different rights according to the overall rights defined for the conference. These member lists can have a variable range, starting from the member list that has full control of the conference (maximum set of rights) down to "default" rights that are assigned for any user that is allowed to join even if there is no match with any existing member list.

Figure 3:
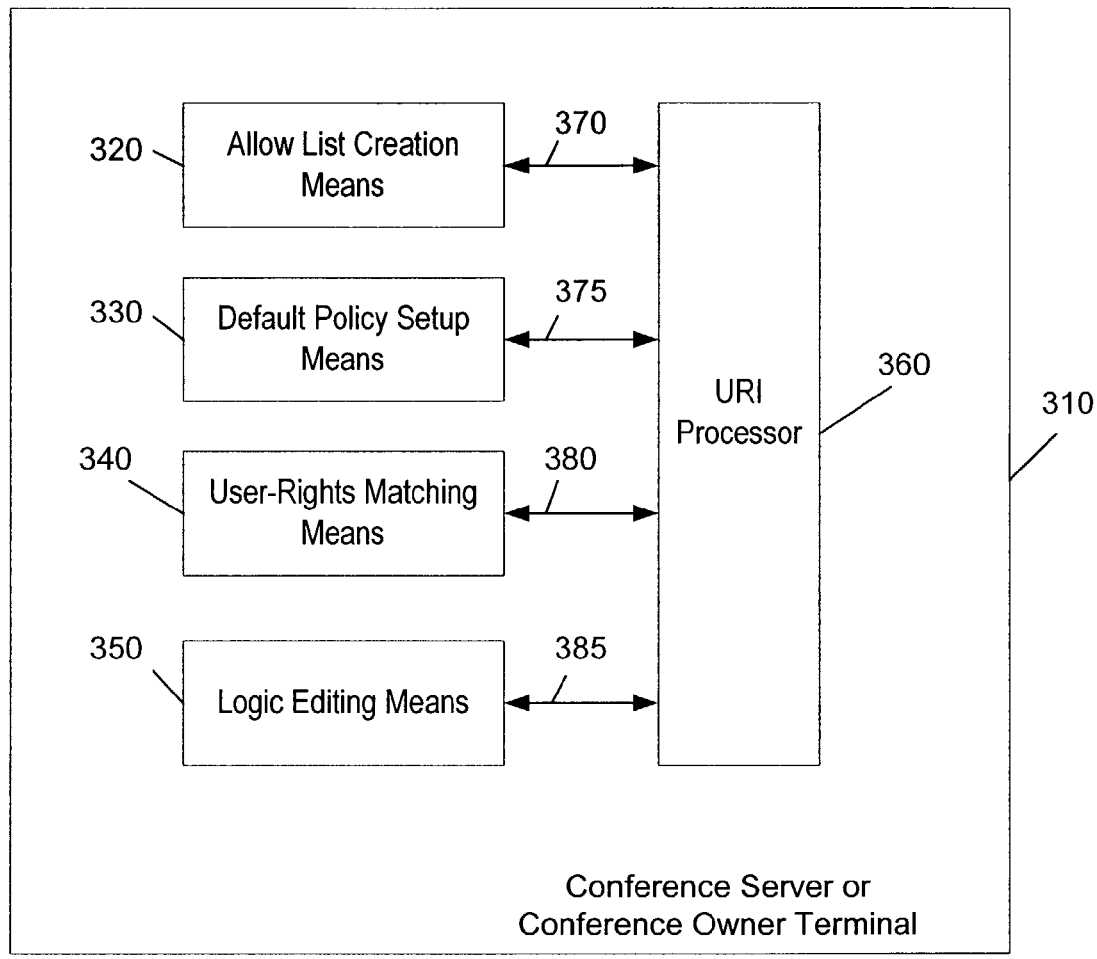
FIG. 3 is a block diagram illustrating an apparatus according to a best embodiment of the present invention, where the apparatus is a conference server or a terminal.

An apparatus 310 for implementing this method is shown in FIG. 3. This apparatus can be a terminal of the conference owner, or it can be the conference server. In the latter case, its operation will be highly responsive to input from the terminal of the conference owner.

The apparatus 310 should include an allow list creation means 320 for creating at least one allow list in the apparatus, a default policy setup means 330 for setting up the default policy in the apparatus, and a user-rights matching means 340 for ascertaining the rights of each user. The user-rights matching means 340 would, for example, match each allow list with a set of rights, and therefore the users listed in each allow list would also be matched with that set of rights, with users in multiple lists being matched with the sum of corresponding rights. The logic editing means 350 would allow for editing of the allow lists, of the user-rights matching, and/or of the default policy.

In this embodiment, each of the four means on the left-hand-side of FIG. 3 should operate in conjunction with a URI processor 360 via the signals 370, 375, 380, and 385. In this way, the conference server will be able to identify the correct means for a conference based upon the URI, and likewise the conference owner terminal will be able to specify to the conference server a URI that indicates which access logic to create or modify.

Figure 4:
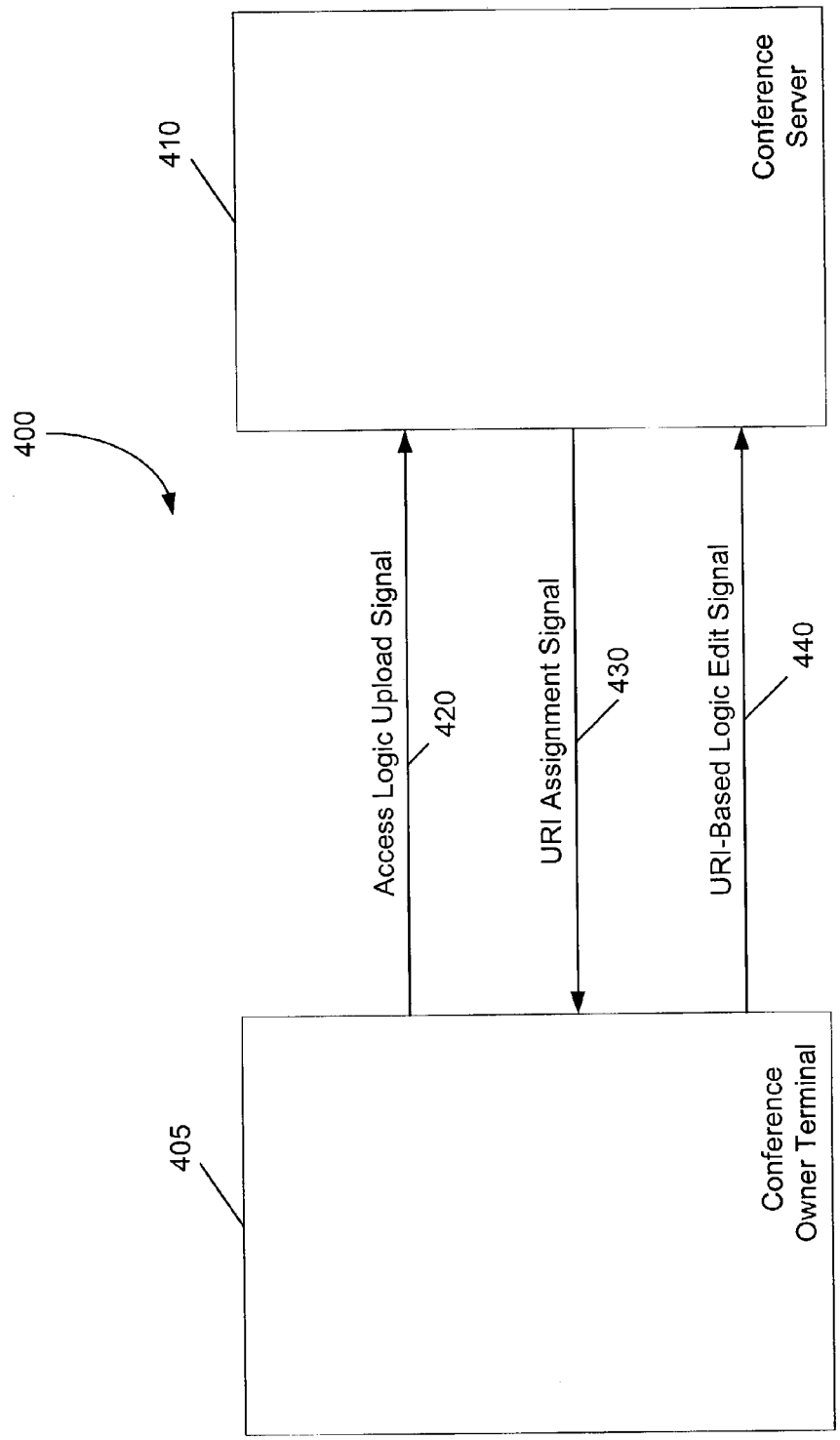
FIG. 4 illustrates a system according to the present invention.

FIG. 4 shows a system 400 consisting of a conference owner terminal 405 and a conference server 410. Of course, this embodiment could be easily modified if the conference owner decides to allow someone else, such as a conference chair, create or modify the access logic, in which case the conference owner terminal would be replaced by a conference chair terminal.

The conference owner terminal 405 provides an access logic upload signal 420 to the conference server 410 which conveys to the conference server the access logic such as allow lists, default policy, and the matching of users with rights. In response, the conference server 410 provides a URI assignment signal 430 which gives a uniform resource identifier (URI) to identify the uploaded access logic. Then the conference owner terminal 405 can send a URI-based logic edit signal 440 in order to identify an access logic in the conference server, and edit that access logic. The URI can not only identify one of a plurality of access logics within the conference server, but can also or alternatively identify which conference server is storing the access logic identified by the URI.

Figure 5:
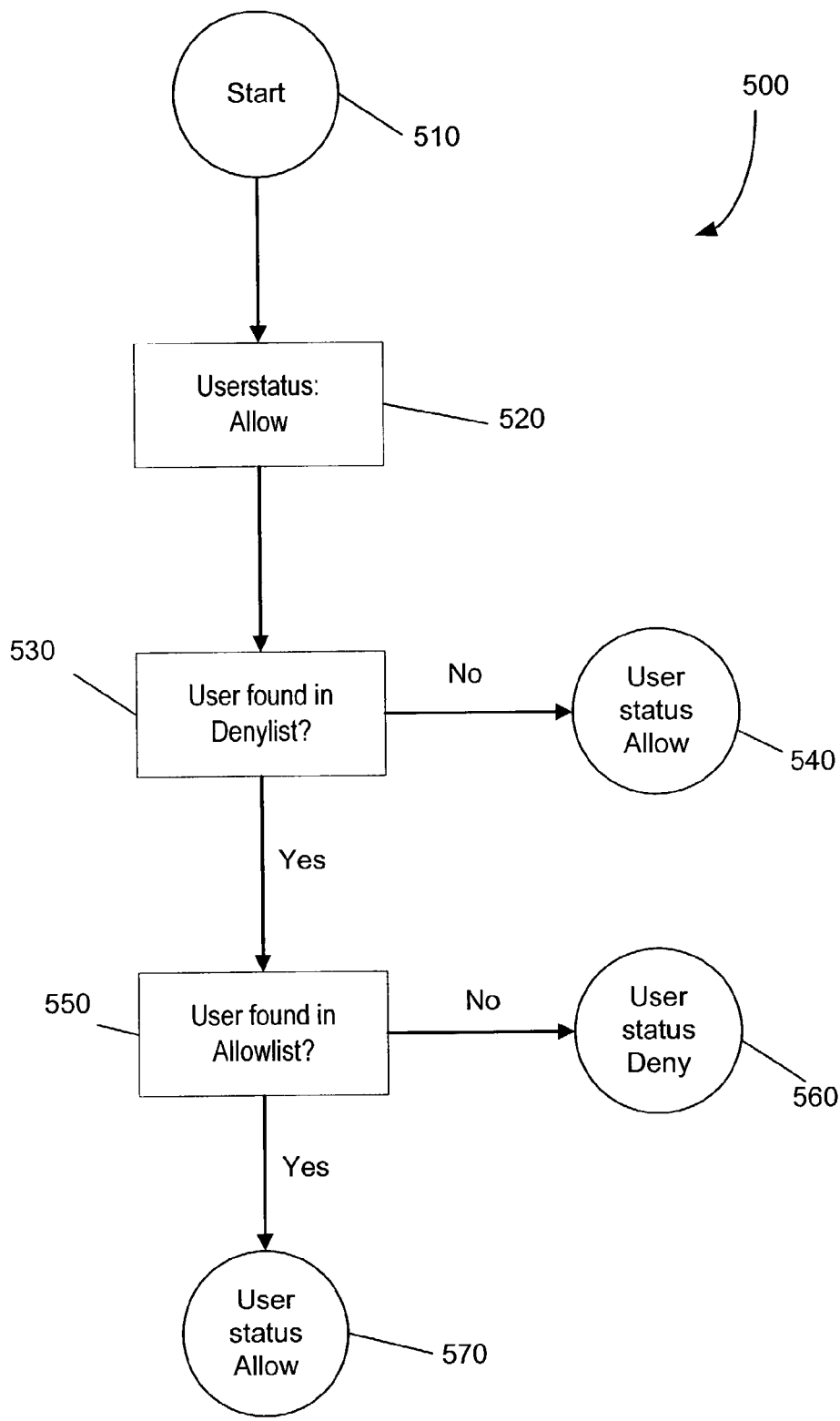
FIG. 5 is a flow chart illustrating access control if default policy is "allow."

FIG. 5 is a flow chart 500 when the default policy is to allow access. After the process starts 510, the user status has the default value to allow access 520. Then a deny list is checked 530. If the user is not in the deny list, then the final user status is to allow access 540. However, if the user was listed in the deny list, then the allow list is checked 550, and the final user status will be allow access 570 or deny access 560 according to whether the user is listed in the allow list or not.

Figure 6:
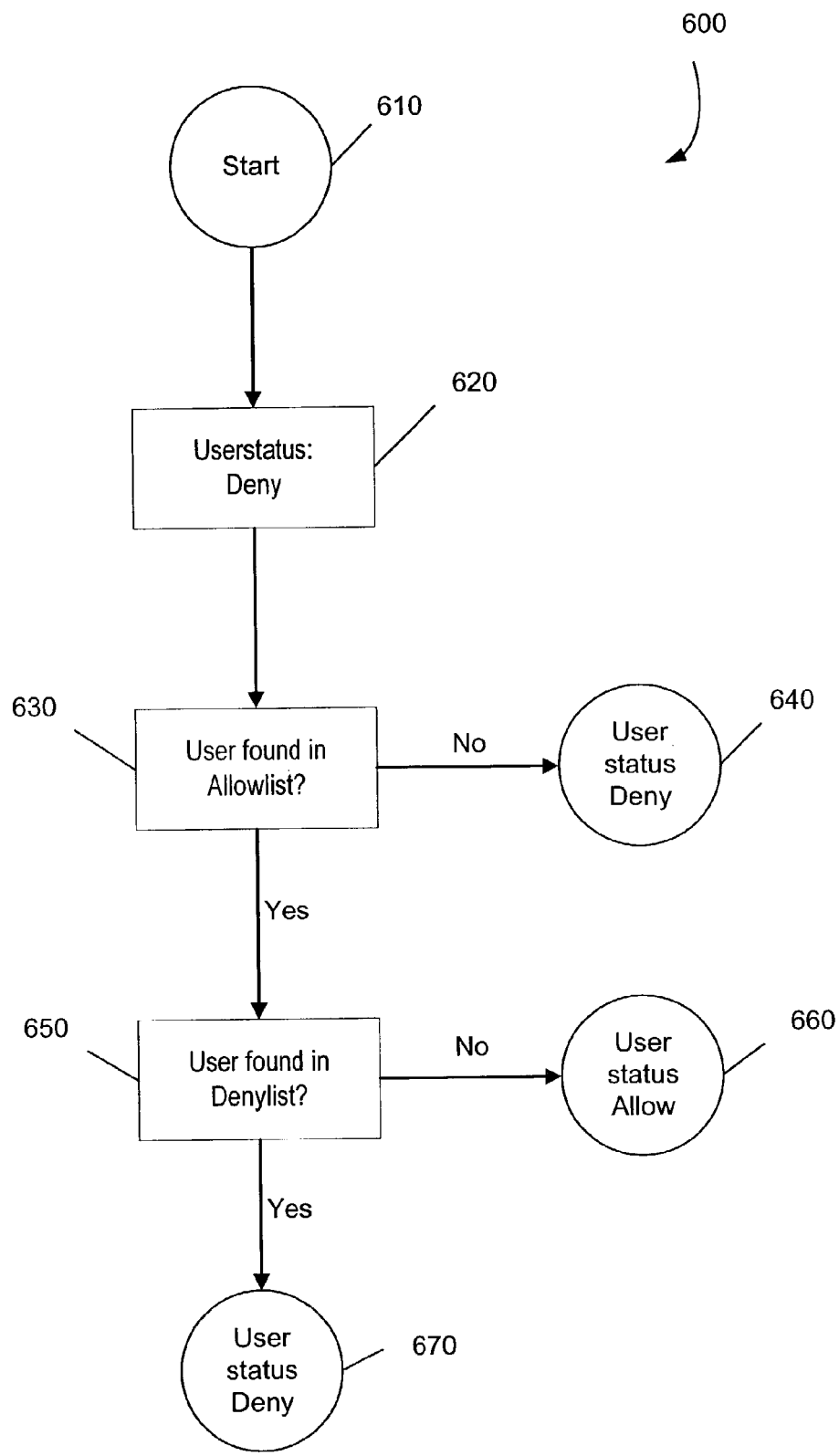
FIG. 6 is a flow chart illustrating access control if default policy is "deny."

FIG. 6 is a flow chart 600 when the default policy is to deny access. After the process starts 610, the user status has the default value to deny access 620. Then an allow list is checked 630. If the user is not in the allow list, then the final user status is to deny access 640. However, if the user was listed in the allow list, then the deny list is checked 650, and the final user status will be deny access 670 or allow access 660 according to whether the user is listed in the deny list or not.

Figure 7:
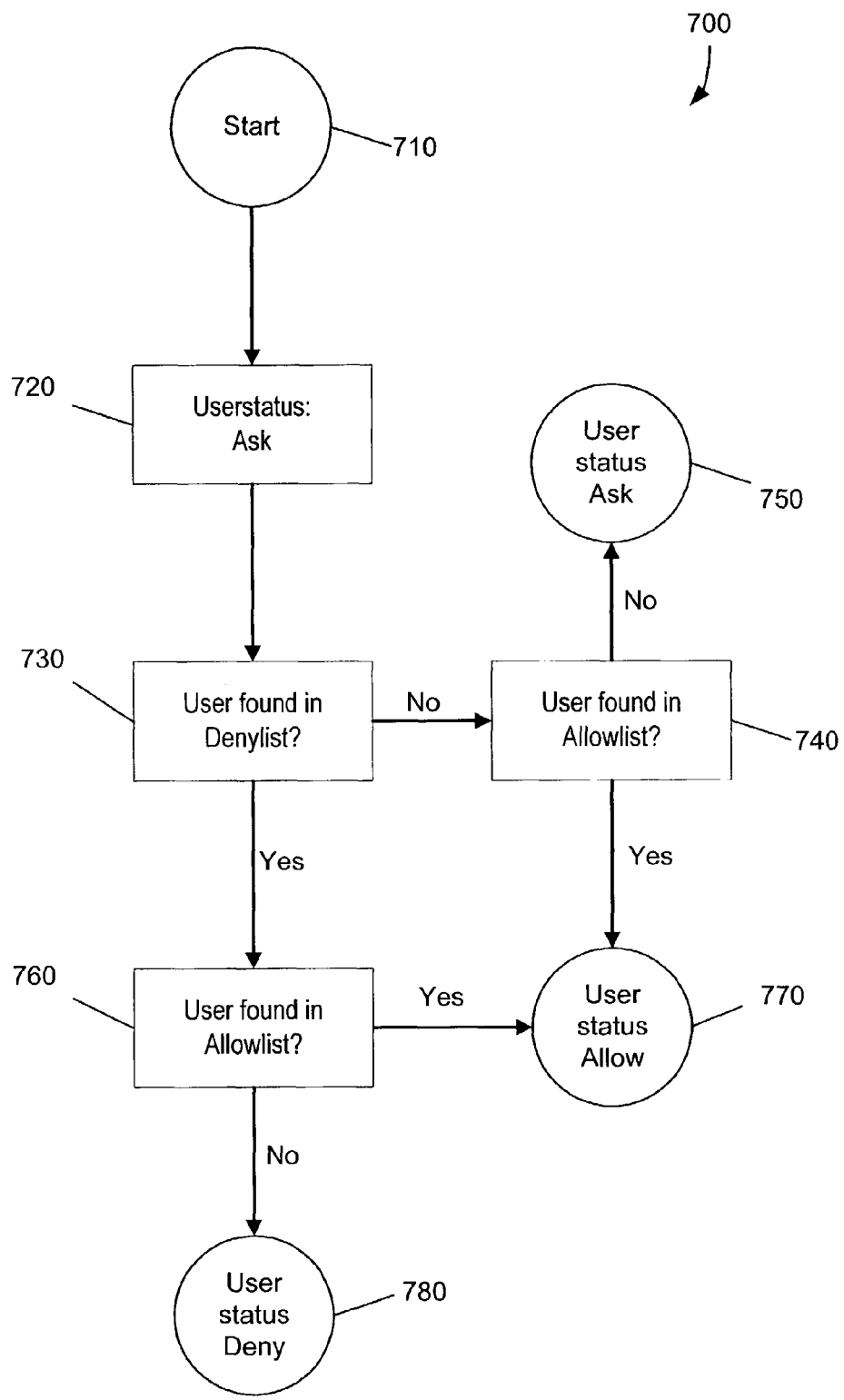
FIG. 7 is a flow chart illustrating access control if default policy is "ask."

FIG. 7 is a flow chart 700 when the default policy is to ask permission for access. After the process starts 710, the user status has the default value to ask 720. Then a deny list is checked 730. If the user is not in the deny list, then the allow list is checked 740, and the allow list is also checked 760 if the user is in the deny list; if the user is in the allow list then the user's final status will be to allow access 770. If the user was listed in neither an allow list nor a deny list, then the final user status is to ask for access 750. However, if the user was listed in the deny list but not in the allow list, then the final user status is denied access 780.

FIGS. 5, 6, and 7 thus provide a clear access routine, including a "sanity check" just in case a user is listed in both a deny list as well as an allow list. Sanity checks are preferably also possible before (and/or after) entries are added to allow or deny lists, so that overlap between the allow and deny lists can be efficiently identified and remedied. This applies both to addition of individual user entries, and to addition of wildcard entries covering multiple individual users. Whenever a sanity check turns up an insanity (i.e. an inconsistency), then an error message will preferably be sent to the user (e.g. to the conference owner terminal).

Figure 8:
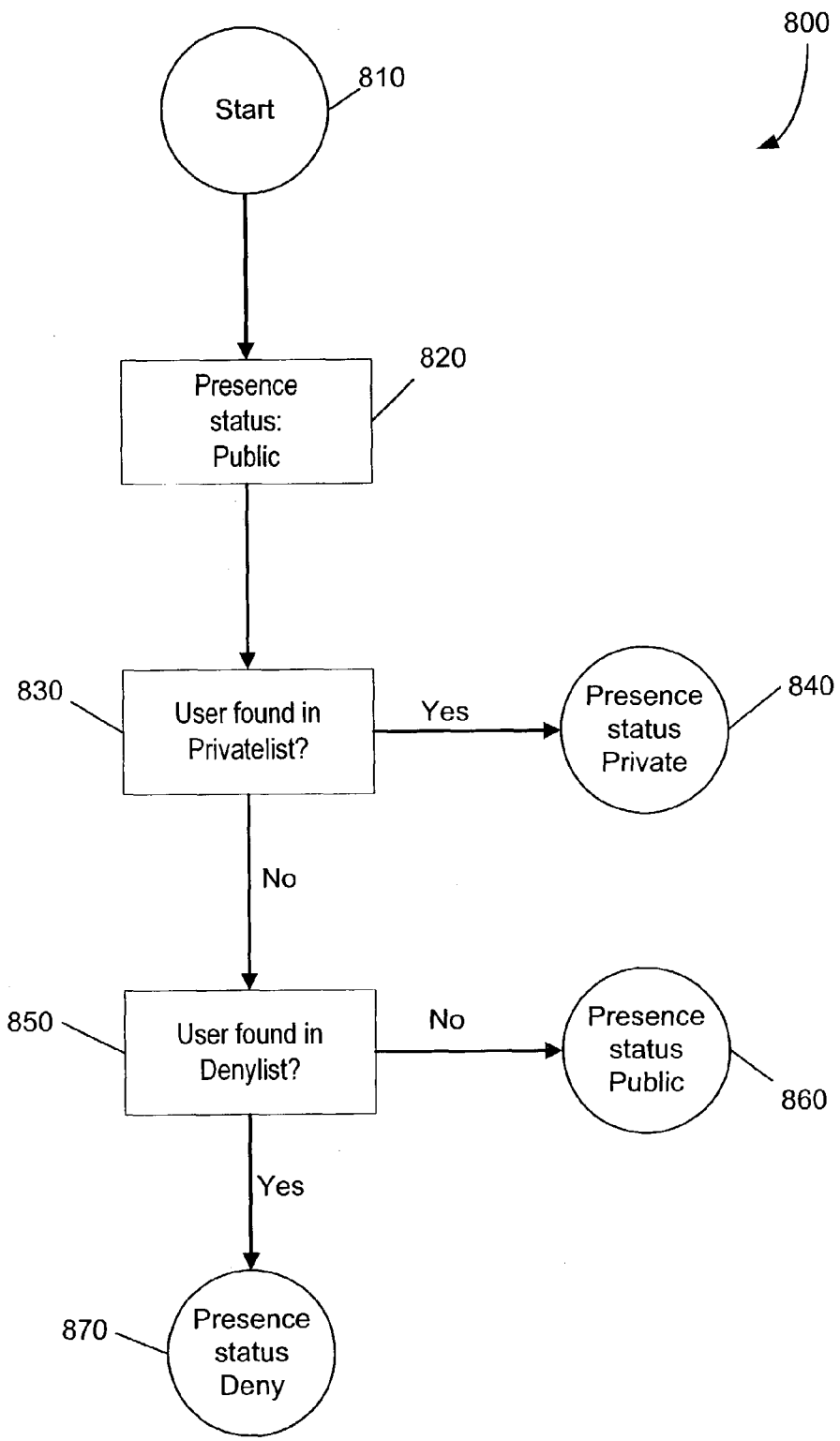
FIG. 8 is a flow chart illustrating access control if default policy is "public."

FIG. 8 is a flow chart 800 when the default policy is public, meaning that unlisted users will get access but with minimal rights. After the process starts 810, the user has a presence status that is the default value "public" 820. Then a private list is checked 830. If the user is in the private list, then the final user status is private 840. However, if the user was not listed in the private list, then the deny list is checked 850, and the final user status will be deny access 670 or public 660 according to whether the user is listed in the deny list or not.

It is to be understood that all of the present Figures, and the accompanying narrative discussions of the best mode embodiments, do not purport to be completely rigorous treatments of the method under consideration. A person skilled in the art will understand that the steps and signals of the present application represent general cause-and-effect relationships that do not exclude intermediate interactions of various types, and will further understand that the various steps and structures described in this application can be implemented by a variety of different combinations of hardware and software that need not be further detailed herein.

What is claimed is:

1. A method comprising:
   establishing at least one allow list of allowed users for a conference in a network,
   setting up a default policy for said conference applicable at least to access of all users seeking access to said conference, wherein the default policy is selected from the group consisting of allowing access, denying access, and asking permission to access, and wherein each default policy uses for access control both the at least one allow list and at least one deny list,
   implementing the set up default policy to allow or deny access by the users seeking access to the conference,
   matching users allowed to access the conference with corresponding conference rights,
   specifying a uniform resource identifier to indicate a conferencing access logic of the conference, and
   editing elements of the conferencing access logic for setting up at least another conference,
   wherein said elements include the at least one deny list, the at least one allow list, the default policy, and the conference rights.

2. A method of claim 1, further comprising forming a particular access sanity algorithm that corresponds to the default policy being a particular policy,
   wherein the particular access sanity algorithm specifies a type of access for a user listed in both the at least one allow list and at least one deny list.

3. A method of claim 2, wherein the type of access is identical to the particular policy applicable to the users seeking access to the conference.

4. A method of claim 1, wherein each of the at least one allow list confers a set of the conference rights on the listed users, and
   wherein listing on a plurality of allow lists causes a user to be matched with a union of respective sets of the conference rights.

5. A method of claim 1, further comprising
   causing, at least in part, storage of the access logic in a conference server after the conference is completed,
   uploading the edited conferencing access logic that is identified by the uniform resource identifier, and
   setting up the at least another one conference based upon the edited conferencing access logic.

6. A method of claim 1, further comprising:
   compiling at least one deny list of users to be denied access, and
   eliminating any overlap between the at least one allow list and the at least one deny list, wherein the allow list or the deny list includes at least one wildcard covering a plurality of users.

7. A method of claim 1, wherein the group further comprises anonymous access and hidden access.

8. A method of claim 1, wherein at least one of the conference rights is included in the group comprised of a right to terminate the conference, a right to transfer rights, a right to manage general conference properties, a right to disconnect participants, a right to manage at least one access control list, a right to grant permission to access the conference, a right to revoke rights, and a right to grant rights.

9. A method of claim 1 wherein the default policy is public access that provides a user, that is not listed in the allow list, access to the conference by:
   checking whether the user is in a private list;
   if the user is not in the private list, checking whether the user is in a deny list; and
   if the user is not listed in the deny list, providing the user the access to the conference.

10. A method of claim 1, wherein the default policy is asking permission to access that provides a user access to the conference by: checking if the user is listed in the allow list or a deny list, and if the user is not listed in the allow list or the deny list, providing the user the access to the conference when a permission to access is given.

11. A method of claim 1, wherein the default policy is allowing access, and wherein the method further comprises accessing the at least one deny list prior to accessing the at least one allow list in order to determine whether the users seeking access to the conference are in the at least one deny list or in the at least one allow list or in both lists, and, based on a determination whether the users seeking access to the conference are in the at least one deny list or in the at least one allow list or in both lists, allowing or denying access to the conference.

12. A method of claim 1, wherein the default policy is denying access, and wherein the method further comprises accessing the at least one access list prior to accessing the at least one deny list in order to determine whether the users seeking access to the conference are in the at least one deny list or in the at least one allow list or in both lists, and, based on a determination whether the users seeking access to the conference are in the at least one deny list or in the at least one allow list or in both lists, allowing or denying access to the conference.

13. A method of claim 1, wherein the default policy is asking permission to access, and wherein the method further comprises accessing the at least one deny list and the at least one allow list prior to performing a process of asking for access in order to determine whether the users seeking access to the conference are to be allowed access to the conference, are to be denied access to the conference, or are to be allowed access or denied access to the conference through the process of asking for access.

14. An apparatus comprising:
    at least one processor; and
    at least one memory including computer program code,
    the at least one memory and the computer program code configured to, with the at least one processor, cause the apparatus to perform at least the following,
    establish at least one allow list of allowed users for a conference in a network,
    set up a default policy for said conference applicable at least to access of all users seeking access to said conference, wherein the default policy is selected from the group consisting of allowing access, denying access, and asking permission to access, and wherein each default policy uses for access control both the at least one allow list and at least one deny list,
    implementing the set up default policy to allow or deny access by the users seeking access to the conference, match the users allowed to access the conference with corresponding conference rights, and edit elements of a conferencing access logic of the conference for setting up at least another conference, the conferencing access logic being identified by a uniform resource identifier, said elements including the at least one deny list, the at least one allow list, the default policy, and the conference rights.

15. An apparatus of claim 14, wherein the default policy is public access that provides a user, that is not listed in the allow list, access to the conference by:

checking whether the user is in a private list;
if the user is not in the private list, checking whether the user is in a deny list; and
if the user is not listed in the deny list, providing the user the access to the conference.

16. An apparatus of claim 14, wherein the apparatus is further caused to:

compile at least one deny list of users to be denied access, and
eliminate any overlap between the at least one allow list and the at least one deny list,
wherein the allow list or the deny list includes at least one wildcard covering a plurality of users.

17. An apparatus of claim 14, wherein the apparatus is further caused to form a particular access sanity algorithm that corresponds to the default policy being a particular policy, wherein the particular access sanity algorithm specifies a type of access for a user listed in both the at least one allow list and at least one deny list.

18. An apparatus of claim 14, wherein the group further comprises anonymous access and hidden access.

19. An apparatus of claim 14, wherein at least one of the conference rights is included in the group comprised of a right to terminate the conference, a right to transfer rights, a right to manage general conference properties, a right to disconnect participants, a right to manage at least one access control list, a right to grant permission to access the conference, a right to revoke rights, and a right to grant rights.

20. An apparatus of claim 14, wherein the apparatus is a user terminal.

21. An apparatus of claim 14, wherein the apparatus is a conference server responsive to input from a user terminal.

22. A method, comprising:

providing by a conference owner terminal an access logic upload signal to a conference server to create a conferencing access logic that governs access to a conference in a network according to at least one deny list and at least one allow list of allowed users, wherein the conferencing access logic sets a default policy for said conference applicable at least to access of all users seeking access to said conference, wherein the default policy is selected from the group consisting of allowing access, denying access, and asking permission to access, and wherein each default policy uses for access control both the at least one allow list and the at least one deny list;

causing, at least in part, reception of a uniform resource identifier assignment signal at the conference owner terminal, in response to the access logic upload signal, and providing by the conference owner terminal a logic edit signal to the conference server in response to the assignment signal, for editing elements of the conferencing access logic and setting up another conference, wherein said elements include the at least one deny list, the at least one allow list and the default policy.

23. A method of claim 22, wherein the default policy is public access that provides a user, that is not listed in the allow list, access to the conference by:

checking whether the user is in a private list;
if the user is not in the private list, checking whether the user is in a deny list; and
if the user is not listed in the deny list, providing the user the access to the conference.

24. A non-transitory computer-readable storage medium carrying one or more sequences of one or more instructions which, when executed by one or more processors, cause an apparatus to at least perform the following steps:

providing an access logic upload signal to a conference server to create a conferencing access logic that governs access to a conference in a network according to at least one deny list and at least one allow list of allowed users, wherein the conferencing access logic sets a default policy for said conference applicable at least to access of all users seeking access to said conference, wherein the default policy is selected from the group consisting of allowing access, denying access, and asking permission to access, and wherein each default policy uses for access control both the at least one allow list and the at least one deny list; causing, at least in part, reception of a uniform resource identifier assignment signal, in response to the access logic upload signal, and providing a logic edit signal to the conference server in response to the assignment signal, for editing elements of the conferencing access logic and setting up another conference, wherein said elements include the at least one deny list, the at least one allow list and the default policy.

25. An apparatus comprising:

at least one processor; and
at least one memory including computer program code,
the at least one memory and the computer program code configured to, with the at least one processor, cause the apparatus to perform at least the following,
provide an access logic upload signal to a conference server to create a conferencing access logic that governs access to a conference in a network according to at least one deny list and at least one allow list of allowed users, wherein the conferencing access logic sets a default policy for said conference applicable at least to access of all users seeking access to said conference, wherein the default policy is selected from the group consisting of allowing access, denying access, and asking permission to access, and wherein each default policy uses for access control both the at least one allow list and the at least one deny list;
cause, at least in part, reception of a uniform resource identifier assignment signal, in response to the access logic upload signal, and
provide a logic edit signal to the conference server in response to the assignment signal, for editing elements of the conferencing access logic and setting up another conference,
wherein said elements include the at least one deny list, the at least one allow list and the default policy.

26. An apparatus of claim 25, wherein each of the at least one allow list confers a set of the conference rights on the allowed users, and wherein listing on a plurality of allow lists causes a user to be matched with a union of respective sets of the conference rights.

27. An apparatus of claim 25, wherein the default policy is public access that provides a user, that is not listed in the allow list, access to the conference by:

checking whether the user is in a private list;
if the user is not in the private list, checking whether the user is in a deny list; and
if the user is not listed in the deny list, providing the user the access to the conference.

28. An apparatus of claim 25, wherein the apparatus is further caused to:
compile at least one deny list of users to be denied access, and
eliminate any overlap between the at least one allow list and the at least one deny list,
wherein the allow list or the deny list includes at least one wildcard covering a plurality of users.

29. An apparatus of claim 25, wherein the apparatus is further caused to form a particular access sanity algorithm that corresponds to the default policy being a particular policy, wherein the particular access sanity algorithm specifies a type of access for a user listed in both the at least one allow list and at least one deny list.

30. A non-transitory computer-readable storage medium carrying one or more sequences of one or more instructions which, when executed by one or more processors, cause an apparatus to at least perform the following steps:
establishing at least one allow list of allowed users for a conference in a network, setting up a default policy for said conference applicable at least to access of all users seeking access said conference, wherein the default policy is selected from the group consisting of allowing access, denying access, and asking permission to access, and wherein each default policy uses for access control both the at least one allow list and at least one deny list,
implementing the set up default policy to allow or deny access by the users seeking access to the conference, matching the users allowed to access the conference with corresponding conference rights, and
editing elements of a conferencing access logic of the conference for setting up at least another conference, the conferencing access logic being identified by a uniform resource identifier, said elements including the at least one deny list, the at least one allow list, the default policy, and the conference rights.

31. A non-transitory computer-readable storage medium of claim 30, wherein the apparatus is caused to further perform:
causing, at least in part, storage of the access logic in the conference server after the conference is completed, uploading the edited conferencing access logic that is identified by the uniform resource identifier, and
setting up the at least another one conference based upon the edited conferencing access logic.

* * * * *